United States Patent
Cruzado-Park

(10) Patent No.: US 12,442,790 B2
(45) Date of Patent: Oct. 14, 2025

(54) FAST AND EFFECTIVE CONDITIONING SOLUTION FOR NEUTRAL CAPILLARY USED IN CAPILLARY ISOELECTRIC FOCUSING

(71) Applicant: DH Technologies Development Pte. Ltd., Singapore (SG)

(72) Inventor: Ingrid Cruzado-Park, Pomona, CA (US)

(73) Assignee: DH Technologies Development Pte. Ltd., Singapore (SG)

( * ) Notice: Subject to any disclaimer, the term of this patent is extended or adjusted under 35 U.S.C. 154(b) by 369 days.

(21) Appl. No.: 18/043,358

(22) PCT Filed: Aug. 25, 2021

(86) PCT No.: PCT/IB2021/057798
§ 371 (c)(1),
(2) Date: Feb. 28, 2023

(87) PCT Pub. No.: WO2022/049458
PCT Pub. Date: Mar. 10, 2022

(65) Prior Publication Data
US 2023/0324333 A1    Oct. 12, 2023

Related U.S. Application Data

(60) Provisional application No. 63/074,233, filed on Sep. 3, 2020.

(51) Int. Cl.
*G01N 27/447* (2006.01)
*C08K 5/09* (2006.01)
*C08L 71/02* (2006.01)

(52) U.S. Cl.
CPC ......... *G01N 27/44747* (2013.01); *C08K 5/09* (2013.01); *C08L 71/02* (2013.01); *G01N 27/44795* (2013.01)

(58) Field of Classification Search
None
See application file for complete search history.

(56) References Cited

U.S. PATENT DOCUMENTS

| | | | |
|---|---|---|---|
| 4,626,355 A | 12/1986 | Joustra | |
| 6,555,515 B1 * | 4/2003 | Hees | C11D 1/83 510/535 |

FOREIGN PATENT DOCUMENTS

| | | |
|---|---|---|
| CN | 102533129 A | 7/2012 |
| CN | 104099622 A | 10/2014 |

(Continued)

OTHER PUBLICATIONS

K. Sumitomo, et al., "Acetic acid denaturing for RNA capillary polymer electrophoresis", Electrophoresis, 30(9): p. 1538-1543, May 2009.*

(Continued)

*Primary Examiner* — J. Christopher Ball
(74) *Attorney, Agent, or Firm* — Lathrop GPM LLP; Malaika O. D. Tyson

(57) ABSTRACT

The presently claimed and described technology is directed to an acidic high polymer composition comprising about 1.0% (w/v) polymer and about 4% (v/v) carboxylic acid. The acid high polymer composition may be used as a neutral capillary storage or conditioning solution or in a method of improving capillary isoelectric focusing (cIEF) robustness or performance. The technology is also directed to a kit comprising an acidic high polymer composition, at least one stabilizer, an anolyte, and a catholyte.

14 Claims, 18 Drawing Sheets

(56) References Cited

FOREIGN PATENT DOCUMENTS

| CN | 108359538 A | 8/2018 |
|---|---|---|
| WO | 2019148198 A | 8/2019 |

OTHER PUBLICATIONS

Y. Yamaguchi, et al., "Polyethylene Oxide (PEO) and Polyethylene Glycol (PEG) Polymer Sieving Matrix for RNA Capillary Electrophoresis", PLOS One, 10(5): 12 pages, May 2015.*

International Search Report and Written Opinion for PCT Patent Application No. PCT/IB2021/057798 mailed Jan. 7, 2022.

Huang et al., "Development of a High-Performance Capillary Isoelectric Focusing Technique with Application to Studies of Microheterogeneity in Chicken Onalbumin", Journal of Chromatography A, Elsevier, Amsterdam, NL, vol. 757, No. 1-2, Jan. 3, 1997, pp. 247-253.

International Preliminary Report on Patentability, PCT/IB2021/057798 dated Mar. 16, 2023, 8 pages.

* cited by examiner

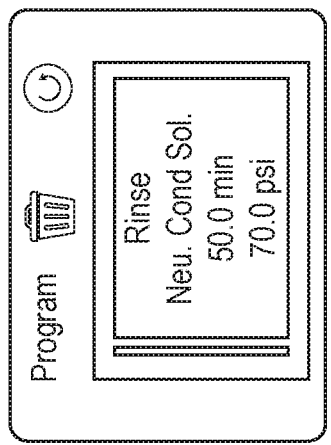
FIG. 3A
Method Duration: 50.0 min    Number of Actions: 1
Settings
- Capillary Cartridge: 20.0 °C, Wait
- Capillary Length: 30.0 cm
- Capillary Type: Neutral
- Capillary Limit: 600 µA
- Sample Storage: 10.0 °C, Wait
- Detector Type: UV, 280 nm, Wait
- Peak Width: 2 sec
- Data Rate: 4 Hz
Rinse
- Duration: 5.0 min
- 70.0 psi
- Inlet: Neu. Cond. Sol.
- Outlet: Waste
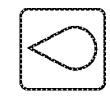
FIG. 3B

| | Time (min) | Event | Value | Duration | Inlet vial | Outlet vial | Summary | Comments |
|---|---|---|---|---|---|---|---|---|
| 1 | | Rinse - Pressure | 50.0 psi | 1.00 min | BI:A1 | BO:B1 | forward, In / Out vial inc 10 | DDI water rinse |
| 2 | | Inject - Pressure | 25.0 psi | 99.0 sec | SI:A1 | BO:B1 | Override, forward | Sample fill |
| 3 | | Wait | | 0.00 min | BI:A1 | BO:A1 | In / Out vial inc 10 | Water dip |
| 4 | 0.00 | Separate - Voltage | 25.0 KV | 15.00 min | BI:C1 | BO:C1 | 0.17 Min ramp, normal polarity, In / Out vial inc 10 | Focusing Step |
| 5 | 15.00 | Wait | | 0.00 min | BI:C1 | BO:A1 | In / Out vial inc 10 | |
| 6 | 15.10 | Separate - Voltage | 30.0 KV | 30.00 min | BI:C1 | BO:E1 | 0.17 Min ramp, normal polarity, In / Out vial inc 10 | Chemical Mobilization Step |
| 7 | 45.10 | Stop data | | | | | | Stop cIEF separation |
| 8 | 45.10 | Rinse - Pressure | 50.0 psi | 2.00 min | BI:F1 | BO:F1 | forward, In / Out vial inc 10 | SLS rinse |
| 9 | 47.10 | Rinse - Pressure | 50.0 psi | 2.00 min | BI:B1 | BO:D1 | forward, In / Out vial inc 10 | Water Rinse |
| 10 | 49.10 | Rinse - Pressure | 50.0 psi | 2.00 min | BI:A1 | BO:B1 | forward, In / Out vial inc 10 | water rinse |
| 11 | 51.10 | Rinse - Pressure | 70.0 psi | 2.00 min | BI:E1 | BO:F1 | forward | PEO-HAc rinse - coating btw runs |
| 12 | 53.10 | Wait | | 0.00 min | BI:A1 | BO:A1 | | Water Dip |
| 13 | 53.20 | End | | | | | | Method End |

FIG. 4

Method Duration: 58.3 min    Number of Actions: 11

| | Settings | Capillary Cartridge: | 20.0 °C, Wait | Sample Storage: | 10.0 °C, Wait |
|---|---|---|---|---|---|
| | | Capillary Length: | 30.0 cm | Detector Type: | UV, 280 nm, Wait |
| | | Capillary Type: | Neutral | Peak Width: | 2 sec |
| | | Capillary Limit: | 250 µA, Enabled | Data Rate: | 4 Hz |

| | Rinse | Duration: 2.0 min | Inlet: Water Rinse 2 |
|---|---|---|---|
| | | 50.0 psi | Outlet: Waste |

| | Inject | Duration: 200 sec | Tray: Sample | Outlet: Waste |
|---|---|---|---|---|
| | | 25.0 psi | | |

| | Wait | Duration: 0.0 min | Inlet: Water Dip 1 |
|---|---|---|---|
| | | | Outlet: Water Dip |

| | Separate | Duration: 15.0 min | Inlet: Anolyte |
|---|---|---|---|
| | | 25.0 kV | Outlet: Catholyte |
| | | Ramp time: 0.2 min | |

| | Wait | Duration: 0.0 min | Inlet: Anolyte Dip |
|---|---|---|---|
| | | | Outlet: Water Dip |

| | Separate | Duration: 30.0 min | Inlet: Anolyte |
|---|---|---|---|
| | | 30.0 kV | Outlet: Chem. Mob. |
| | | Ramp time: 0.2 min | |

| | Rinse | Duration: 2.0 min | Inlet: cIEF Formamide |
|---|---|---|---|
| | | 50.0 psi | Outlet: Waste |

| | Rinse | Duration: 2.0 min | Inlet: Water Rinse 3 |
|---|---|---|---|
| | | 50.0 psi | Outlet: Waste |

| | Rinse | Duration: 2.0 min | Inlet: Water Rinse 4 |
|---|---|---|---|
| | | 50.0 psi | Outlet: Waste |

| | Rinse | Duration: 2.0 min | Inlet: Neu. Cond. Sol. |
|---|---|---|---|
| | | 70.0 psi | Outlet: Waste |

| | Wait | Duration: 0.0 min | Inlet: Water Dip 2 |
|---|---|---|---|
| | | | Outlet: Water Dip |

FIG. 5

| Time (min) | Event | Value | Duration | Inlet vial | Outlet vial | Summary | Comments |
|---|---|---|---|---|---|---|---|
| 1 | Lamp - Off | | | | | | |
| 2 | Rinse - Pressure | 50.0 psi | 3.00 min | BI:C6 | BO:C6 | forward | Chemical mobilizer rinse |
| 3 | Rinse - Pressure | 50.0 psi | 3.00 min | BI:A6 | BO:A6 | forward | water rinse |
| 4 | Rinse - Pressure | 70.0 psi | 10.00 min | BI:E1 | BO:D1 | forward | PEO soulition rinse |
| 5 | Wait | | 0.0 min | BI:A1 | BO:A1 | | Idle Position |

FIG. 15

| Method Duration: 15.0 min | Number of Actions: 2 | | | |
|---|---|---|---|---|
| Settings | Capillary Cartridge: | 20.0 °C, Wait | Sample Storage: | 10.0 °C, Wait |
| | Capillary Length: | 30.0 cm | Detector Type: | UV, 280 nm, Wait |
| | Capillary Type: | Neutral | Peak Width: | 2 sec |
| | Capillary Limit: | 100 μA, Enabled | Data Rate: | 4 Hz |
| Rinse | Duration: 5.0 min | | Inlet: Neu. Cond. Sol. | |
| | 70.0 psi | | Outlet: Waste | |
| Rinse | OFF | | | |

FAST AND EFFECTIVE CONDITIONING SOLUTION FOR NEUTRAL CAPILLARY USED IN CAPILLARY ISOELECTRIC FOCUSING

RELATED APPLICATIONS

The present patent application is filed pursuant to 35 U.S.C. 371 as a U.S. National Phase application of International Patent Application No. PCT/IB2021/057798, which was filed Aug. 25, 2021 and is related to and claims the priority benefit of U.S. Provisional Patent Application Ser. No. 63/074,233, filed Sep. 3, 2020, the contents of each is hereby incorporated by reference in its entirety into this disclosure.

BACKGROUND

Capillary Isoelectric Focusing (cIEF) is a high-resolution analytical separation technique based on the isoelectric point of charged molecules. Neutral capillaries used in cIEF must be conditioned with a conditioning solution before use. The conditioning procedure is important to ensure that the surface of the capillary is fully and uniformly coated. Regeneration of the neutral capillaries may also be necessary to keep the analyte from adhering to the capillary walls. Typical conditioning and regeneration techniques can require significant time and specific conditions, which can prevent usage and/or impact efficiency of the capillary and cIEF instrumentation.

SUMMARY

The inventors have recognized the need for a cIEF conditioning solution that can improve the cIEF robustness. In particular, a cIEF conditioning solution that can, at least, minimize cIEF performance variations between capillaries, between lots and within lots, and minimize detection time fluctuations between replicate separations.

One aspect of the disclosure relates to an acidic high polymer composition comprising a polymer and an organic acid. In some aspects, the polymer comprises polyethylene oxide (PEO), polyethylene glycol (PEG), or polyoxyethylene (POE). In some aspects, the organic acid comprises a carboxylic acid. In another aspect, the carboxylic acid may be selected from the group consisting of acetic acid, lactic acid, formic acid, citric acid, oxalic acid, uric acid, malic acid, and tartaric acid. In yet another aspect, the acidic high polymer composition comprises about 1.0% (w/v) polymer and about 4% (v/v) carboxylic acid. In yet another aspect, the acidic high polymer composition comprises about 1.0% (w/v) polyethylene oxide (PEO) and about 4% (v/v) acetic acid (HAc). In some aspects, this acidic high polymer composition can be absorbed by a capillary faster than other cIEF conditioning solutions. In some aspects, the polymer has a molecular weight of at least about 900,000 Daltons. In some aspects, the PEO has a molecular weight of at least about 900,000 Daltons.

One aspect of the disclosure is a neutral capillary storage or conditioning solution comprising an acidic high polymer composition. In some aspects, the acidic high polymer composition comprises about 1.0% (w/v) polymer and about 4% (v/v) carboxylic acid. In another aspect, the acidic high polymer composition comprises about 1.0% (w/v) polyethylene oxide (PEO) and about 4% (v/v) acetic acid (HAc).

One aspect of the disclosure is a method of improving capillary isoelectric focusing (cIEF) robustness or performance, the method comprising preparing a neutral capillary using an acidic high polymer composition. In some aspects, the acidic high polymer composition comprises about 1.0% (w/v) polymer and about 4% (v/v) carboxylic acid. In another aspect, the acidic high polymer composition comprises about 1.0% (w/v) polyethylene oxide (PEO) and about 4% (v/v) acetic acid (HAc). In another aspect, the improved robustness or performance may be selected from the group consisting of reduced column conditioning time, faster capillary absorption, minimized cIEF performance variations between capillaries, between lots and within lots, minimized detection time fluctuations between replicate separations, improved assay robustness, increased detection time reproducibility, and increased coating lifespan and/or uniformity of the capillary coating. In a further aspect, the preparation of the neutral capillary may comprise a step selected from the group consisting of a storing step, a conditioning step, a rinse in separation step, a resting step, a cleaning step, coating regeneration step, and recoating step. In yet a further aspect, preparing the neutral capillary may be conducted at room temperature. In another aspect, the conditioning step may comprise rinsing the neutral capillary with the acidic high polymer composition at 50 psi for 1-30 min. In yet another aspect, the rinse in separation step may comprise rinsing the neutral capillary at least one time with the acidic high polymer composition, formamide, and water. In another aspect, the coating regeneration step and/or recoating step may be performed after the end of 20 cIEF separations. In a further aspect, the coating of the neutral capillary is regenerated within less than 24 hours. In yet a further aspect, the coating of the neutral capillary is regenerated within one hour. In another aspect, the cleaning step comprises rinsing the neutral capillary at least one time with the acidic high polymer composition, acetic acid, and water.

One aspect of the disclosure is a kit comprising at least one stabilizer, an anolyte, a catholyte, and the acidic high polymer composition. In an aspect, the kit comprises an anodic stabilizer and a cathodic stabilizer. In another aspect, the kit further comprises a cIEF gel, a chemical mobilizer, CE-grade water, a carboxylic acid amide, and/or urea or carbamide. In a further aspect, the carboxylic acid amide is formamide Other aspects and features of the present disclosure will become apparent to those ordinarily skilled in the art upon review of the following description of specific embodiments of the disclosure in conjunction with the accompanying figures.

BRIEF DESCRIPTION OF THE DRAWINGS

Embodiments of the present disclosure will now be described, by way of example only, with reference to the attached Figures, wherein:

FIGS. 3A and 3B illustrate a conditioning method according to an embodiment of the disclosure FIG. 4 illustrates a separation method according to an embodiment of the disclosure.

FIG. 5 illustrates a cIEF separation method according to an embodiment of the disclosure.

FIG. 15 illustrates a shutdown method according to an embodiment of the disclosure.

DETAILED DESCRIPTION

Figure 1:
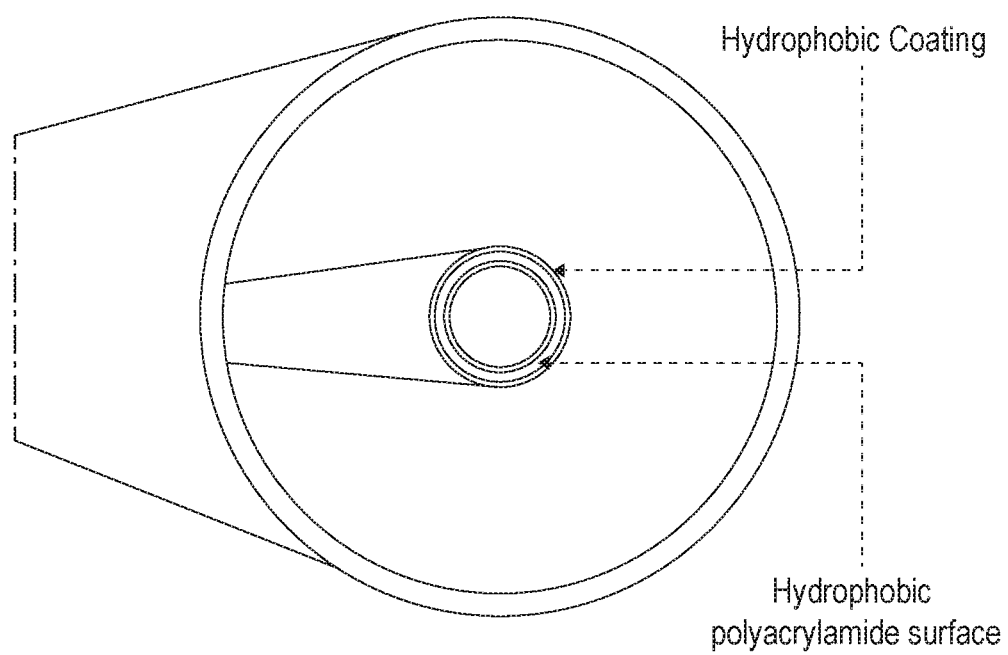
FIG. 1 illustrates a cross-section of a neutral capillary.

It is to be understood that this disclosure is not limited to the particular methodology, protocols, and reagents described herein and as such may vary. It is also to be understood that the terminology used herein is for the purpose of describing particular embodiments only and is not intended to limit the scope of the present disclosure or the appended claims, which will be limited only by the appended claims.

As used herein and in the appended claims, the singular forms "a," "an," and "the" include plural reference unless the context clearly indicates otherwise.

The term "about" is used in connection with a numerical value throughout the specification and the claims denote an interval of accuracy, familiar and acceptable to a person skilled in the art. In general, such an interval of accuracy is +1-10%.

Unless defined otherwise, all technical and scientific terms used herein have the same meaning as commonly understood to one of ordinary skill in the art to which this disclosure belongs.

In an embodiment, an acidic high polymer composition is prepared by any suitable means known in the art and comprises a polymer and an organic acid. Suitable polymers include, but are not limited to, polyethlene oxide (PEO), polyethylene glycol (PEG), or polyoxyethylene (POE). Suitable organic acids include carboxylic acids, such as, but not limited to, acetic acid, lactic acid, formic acid, citric acid, oxalic acid, uric acid, malic acid, and tartaric acid. The pH of the acidic high polymer composition is less than about 6, preferably less than about 5, preferably less than about 4, preferably less than about 3, preferably less than about 2.5.

In an embodiment, the acidic high polymer composition comprises about 1.0% (w/v) polyethylene oxide (PEO) and about 4% (v/v) acetic acid (HAc). It will be appreciated that given the concentration of acetic acid, the acidic high polymer composition will have an acidic pH. In a further embodiment, the polyethylene oxide has a molecular weight of at least about 900,000 Daltons.

In an embodiment, the acidic high polymer composition is used as a cIEF conditioning solution. Due to the low pH, the acidic high polymer composition can be absorbed by a capillary faster than other cIEF conditioning solutions. As applied to cIEF applications, the acidic high polymer composition can be used in methods to improve cIEF robustness or performance. In an embodiment, the acidic high polymer composition can be used in a method that can provide or achieve one or more results that reduce column conditioning time, increase capillary absorption, minimize cIEF performance variations between capillaries between lots and within lots, minimize detection time fluctuations between replicate separations, improve assay robustness, increase detection time reproducibility, and increase coating lifespan and/or uniformity of the capillary coating. It will be appreciated that cIEF applications are conducted at various pressures. Suitable pressures range from about 20 psi—about 100 psi, alternatively from about 25 psi—about 75 psi, alternatively about 25 psi, alternatively about 50 psi, alternatively about 70 psi.

Figure 2A:
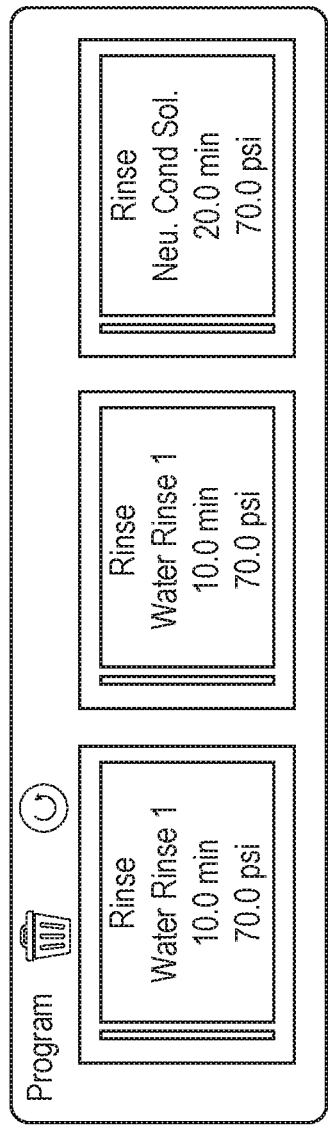
FIGS. 2A and 2B illustrate a conditioning method according to an embodiment of the disclosure
Figure 2B:
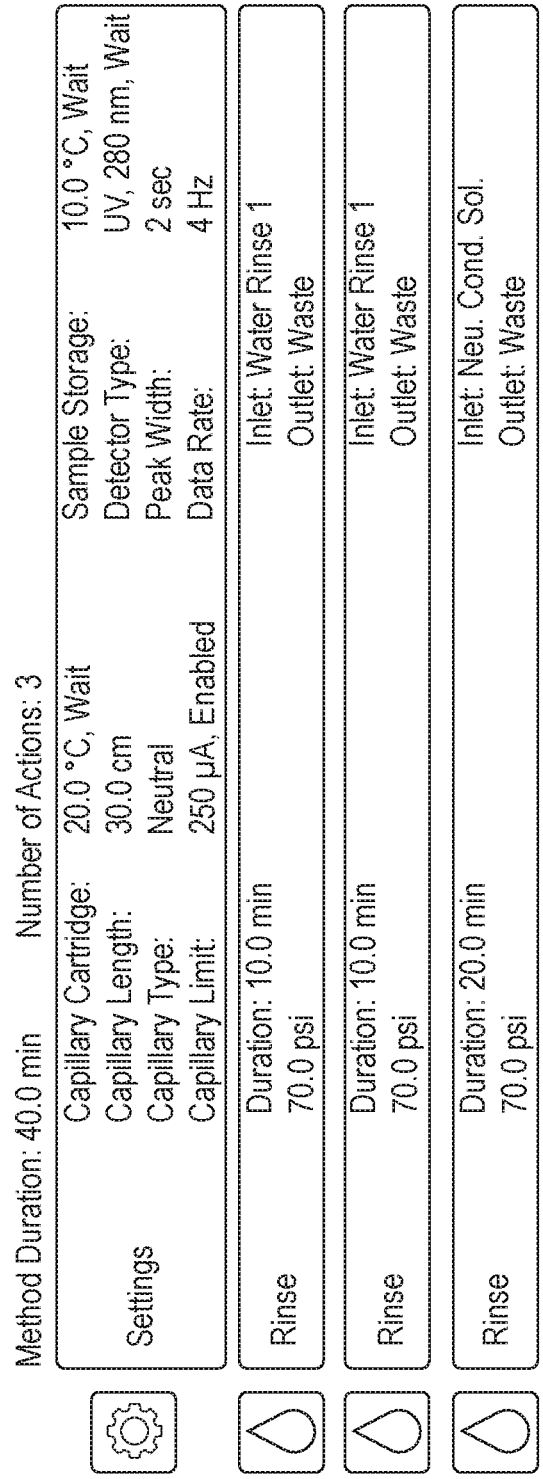

Various conditioning procedures, as illustrated by several example embodiments described herein, may be conducted with respect to the capillary. FIG. 1 illustrates a cross-section of a neutral capillary according to an aspect of this disclosure. In operational examples, which is intended to illustrate by not limit the scope of disclosure, FIGS. 2A, 2B, 3A, and 3B show conditioning methods for a new neutral capillary cartridge. These conditioning methods may be incorporated into a laboratory automation system. FIGS. 2A and 2B show a conditioning method where the neutral capillary is rinsed twice with water for 10 minutes at 70 psi followed by a conducted with the acidic high polymer composition (e.g., Neu. Cond. Sol.) at 70 psi for 20 minutes. FIGS. 3A and 3B show a conditioning method where the neutral capillary is rinsed with the acidic high polymer composition (e.g., Neu. Cond. Sol.) at 70 psi for 5 minutes.

Various separation methods may be conducted using the acidic high polymer composition. In operational examples, which is intended to illustrate but not limit the scope of the disclosure, FIGS. 4 and 5 show separation methods for the conditioned neutral capillary cartridge. FIGS. 4 and 5 shows that a neutral capillary is rinsed with water for 2 minutes at 50 psi, the sample of interest is injected into the neutral capillary and a first separation (15 min at 25 kV) and second separation (30 min at 30 kV) are performed. Prior to the method end step, the neutral capillary is rinsed four times. In this example, the first rinse is conducted with formamide at 50 psi for 2 minutes to remove any remaining sample that may be on the capillary wall. The second and third rinses are conducted with water at 50 psi for 2 minutes for each rinse, and the fourth rinse is conducted with the acidic high polymer composition at 70 psi for 2 minutes to condition the neutral capillary.

Figure 6A:
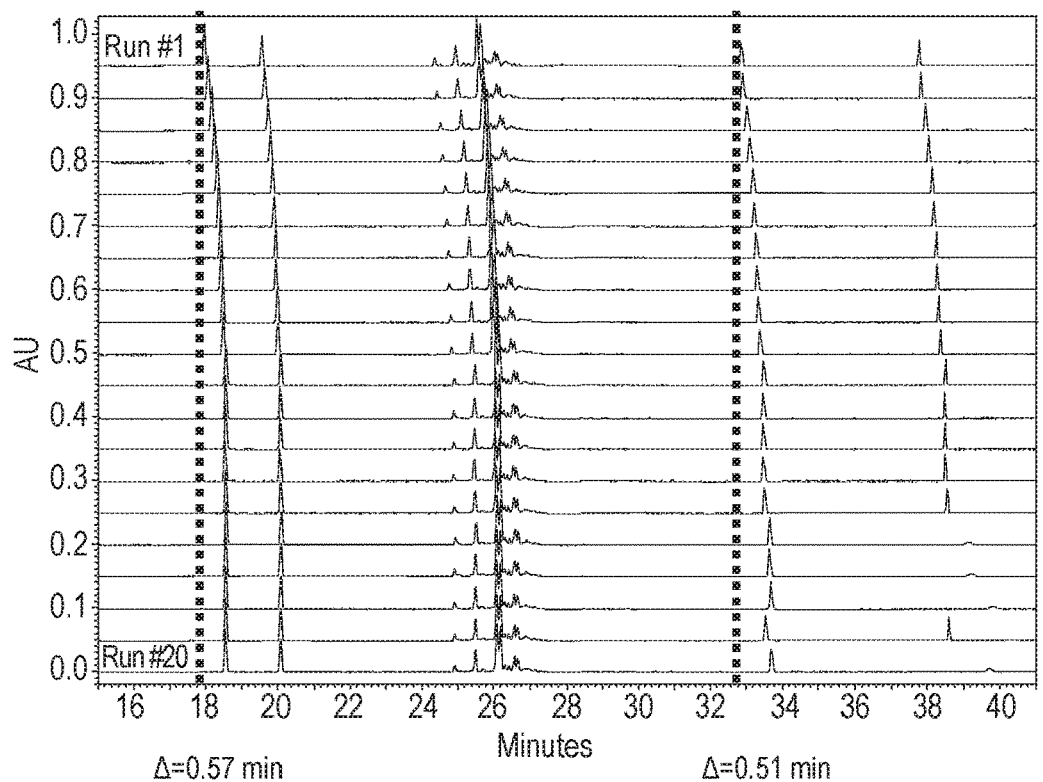
FIG. 6A illustrates the detection times of peptide pI markers with an IgG standard in an unconditioned neutral capillary.
Figure 6B:
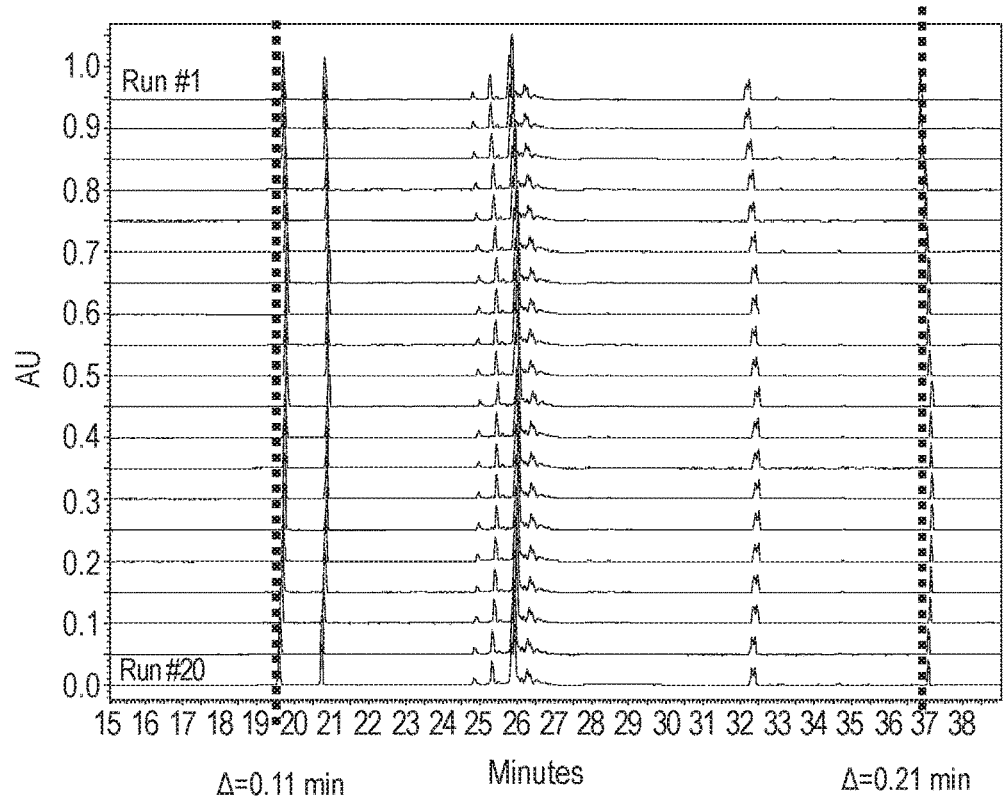
FIG. 6B illustrates the detection times of the same peptide pI markers following the conditioning of a neutral capillary with the acidic high polymer composition according to an embodiment of the disclosure.
Figure 7:
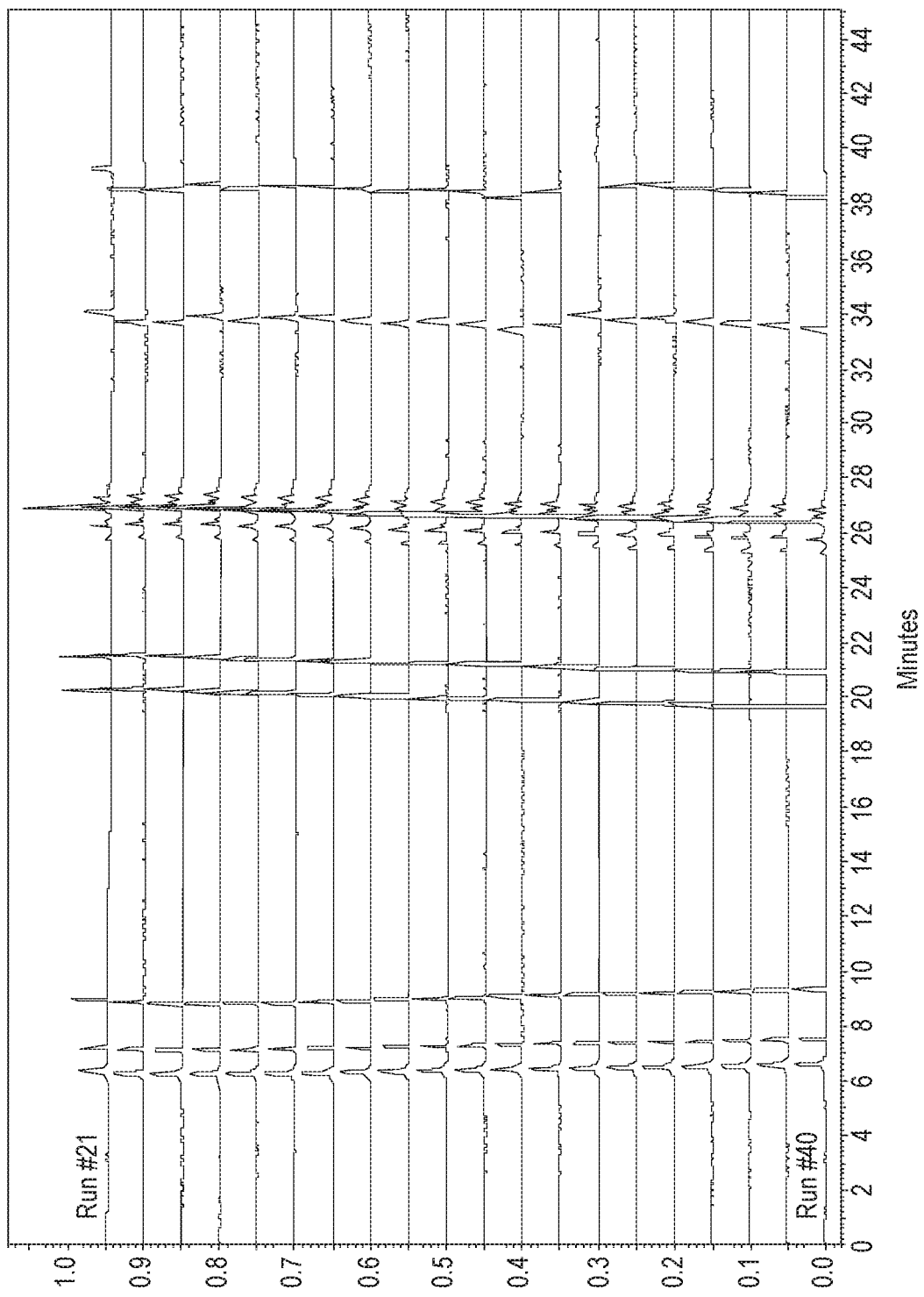
FIG. 7, FIG. 8, FIG. 9, FIG. 10, and FIG. 11 illustrate the reproducibility of cIEF separations according to an embodiment of the disclosure.
Figure 8:
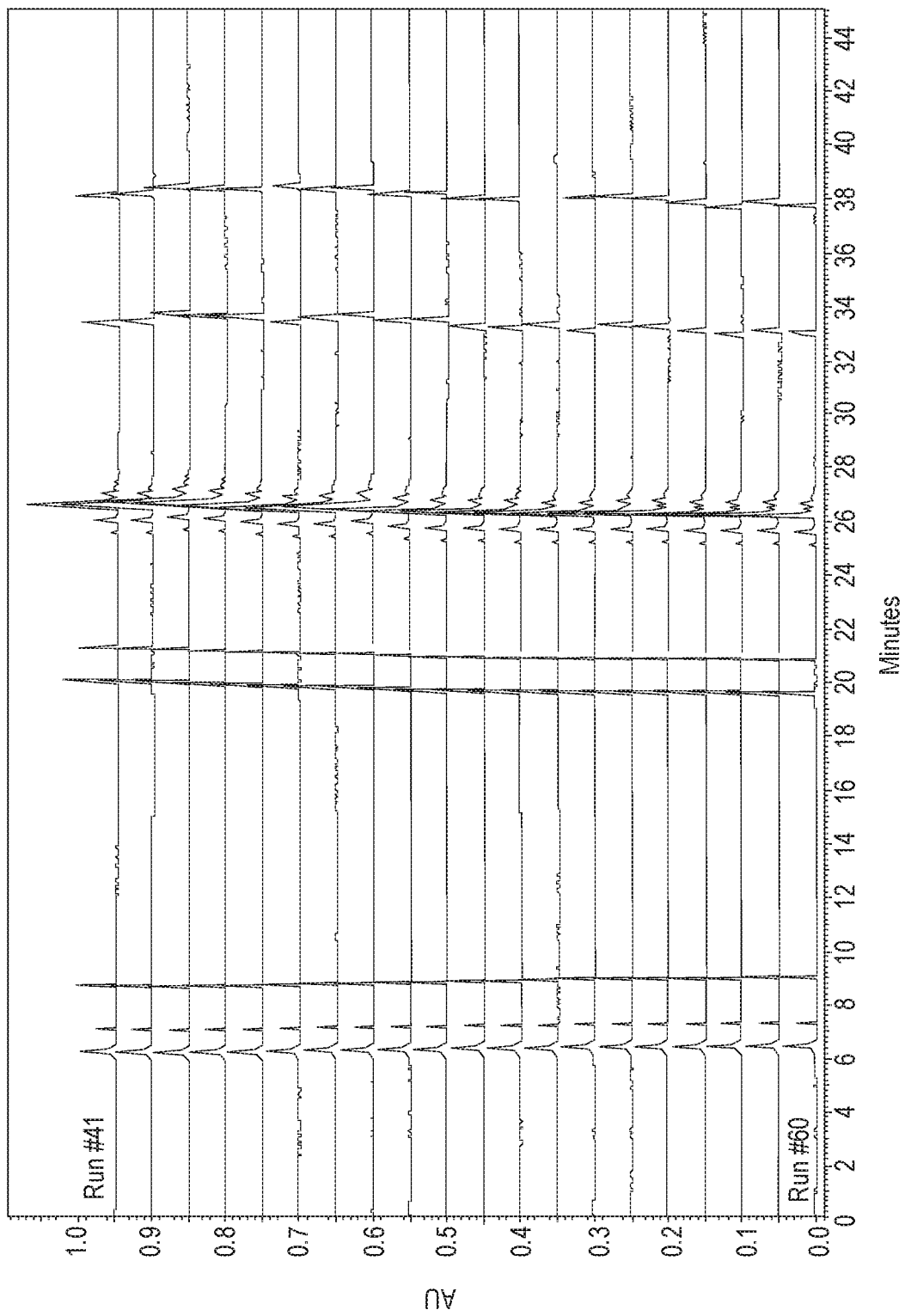
Figure 9:
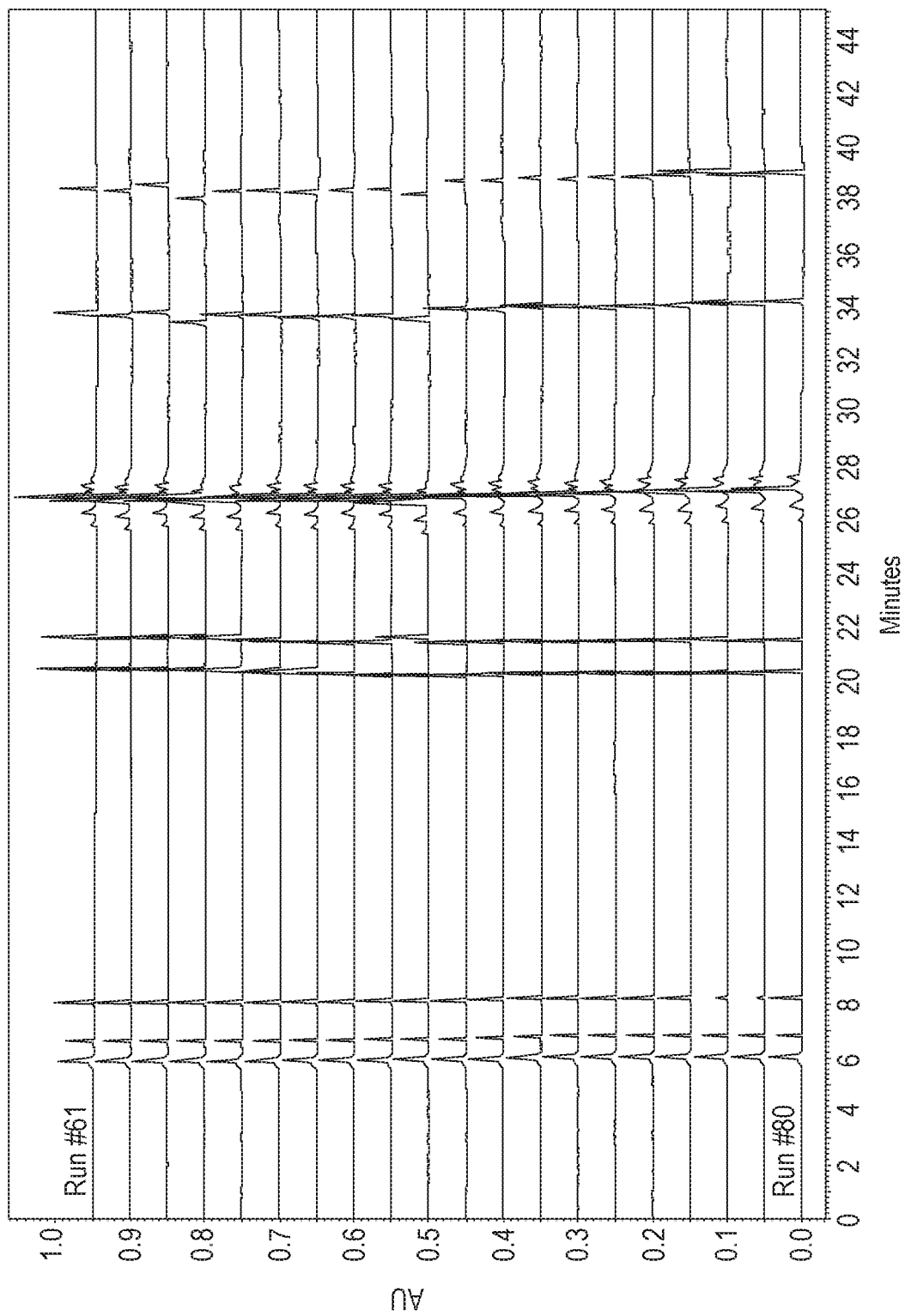

FIG. 6 shows a comparison of detection times of peptide pI markers with an IgG run in an unconditioned neutral capillary (FIG. 6A) and a neutral capillary conditioned with the acidic high polymer composition (FIG. 6B). The delta values are the difference in detection time between the first (Run #1) separation and last (Run #20) separation. As shown, the conditioned neutral capillary exhibits less variability between runs as compared to the unconditioned neutral capillary. FIGS. 7-9 show the reproducibility of cIEF separations after a neutral capillary was heated at 55° C. for 6 days and rinsed with the acidic high polymer composition for 30 min at 50 psi. The cIEF was rested for 24 hrs after every 20 runs.

Figure 10:
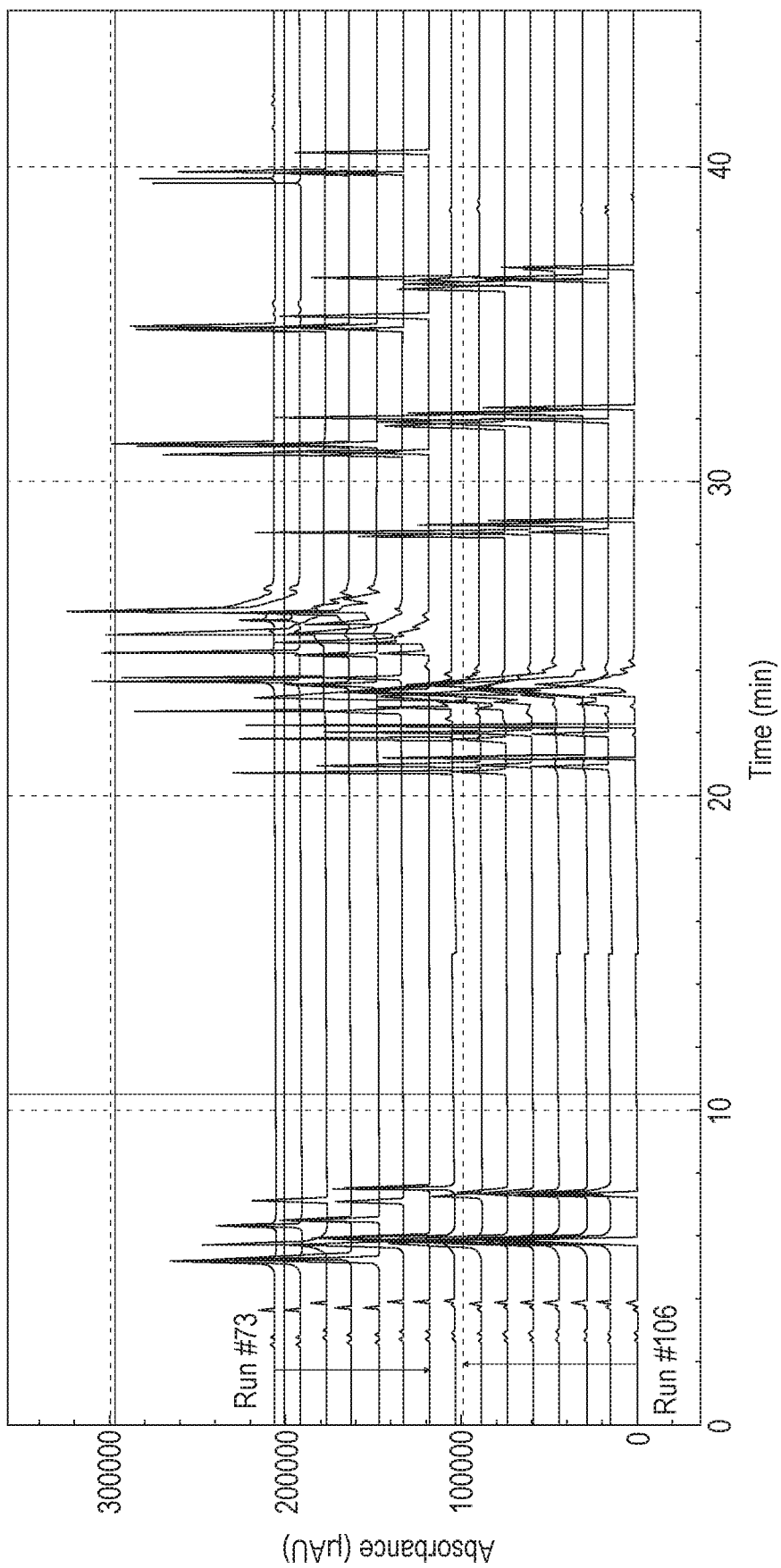
Figure 11:
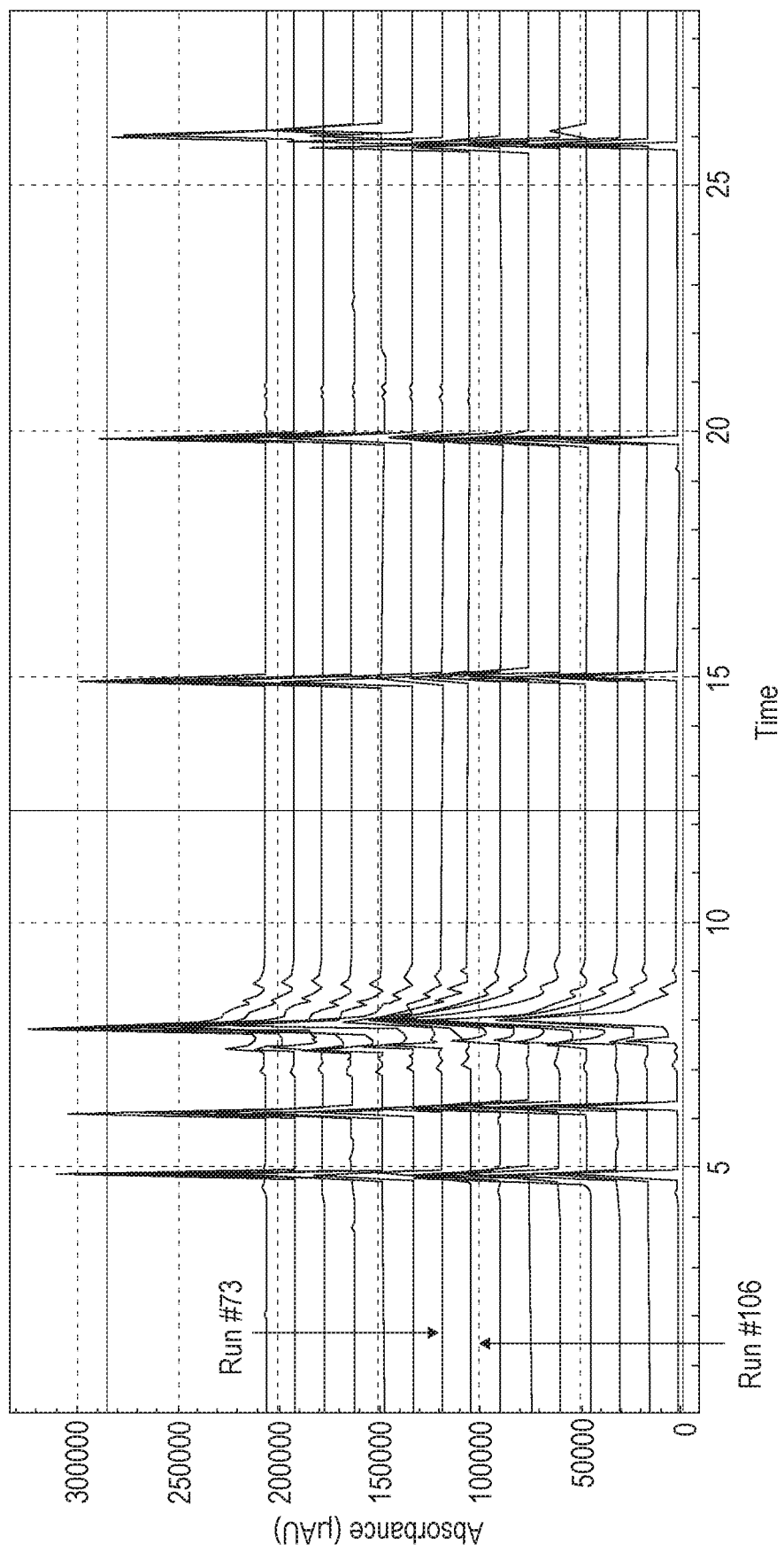

When using peptide pI markers as a test mix, it was determined that the standard deviation in pI measurement is less than 0.05 (n=12), the difference between the measured and theoretical pI value is +/−0.1, the linearity of the assay is above 0.98, and the RSD in peak area % for two pI markers is less than 5% (n=12). FIGS. 10 and 11 illustrate the reproducibility of cIEF separations in a neutral capillary using different cIEF test mixes. FIG. 10 shows the cIEF separation of peptide pI markers and IgG sample using multiple neutral capillaries. A new cIEF sample was prepared between replicates 73 and 106. There is may be a slight fluctuation in detection times when a fresh sample is prepared due to pipetting irreproducibility.

FIG. 11 shows the same data from FIG. 10 except that the x-axis has been converted from detection time in minutes to isoelectric point (pI). This shows that the separation performance is the same when doing this x-axis conversion. Also, both FIGS. 6 and 7 demonstrate that using the acidic high polymer solution extended the neutral capillary run-life over 100 cIEF separations with this sample.

Figure 12:
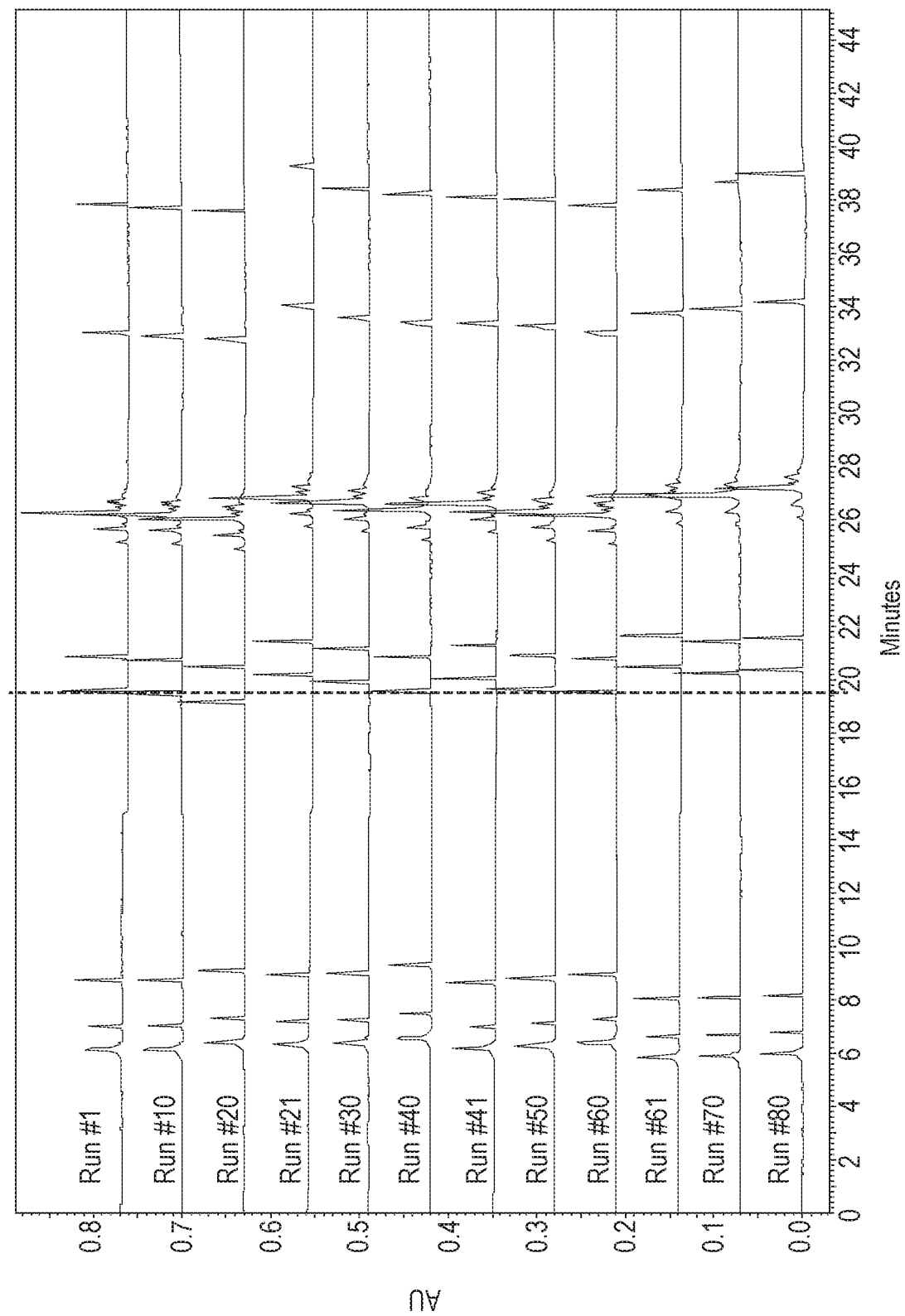
FIG. 12 illustrates the detection times of an IgG Reference Standard with pI 10.0, 9.5, and 5.5 markers according to an embodiment of the disclosure.
Figure 13:
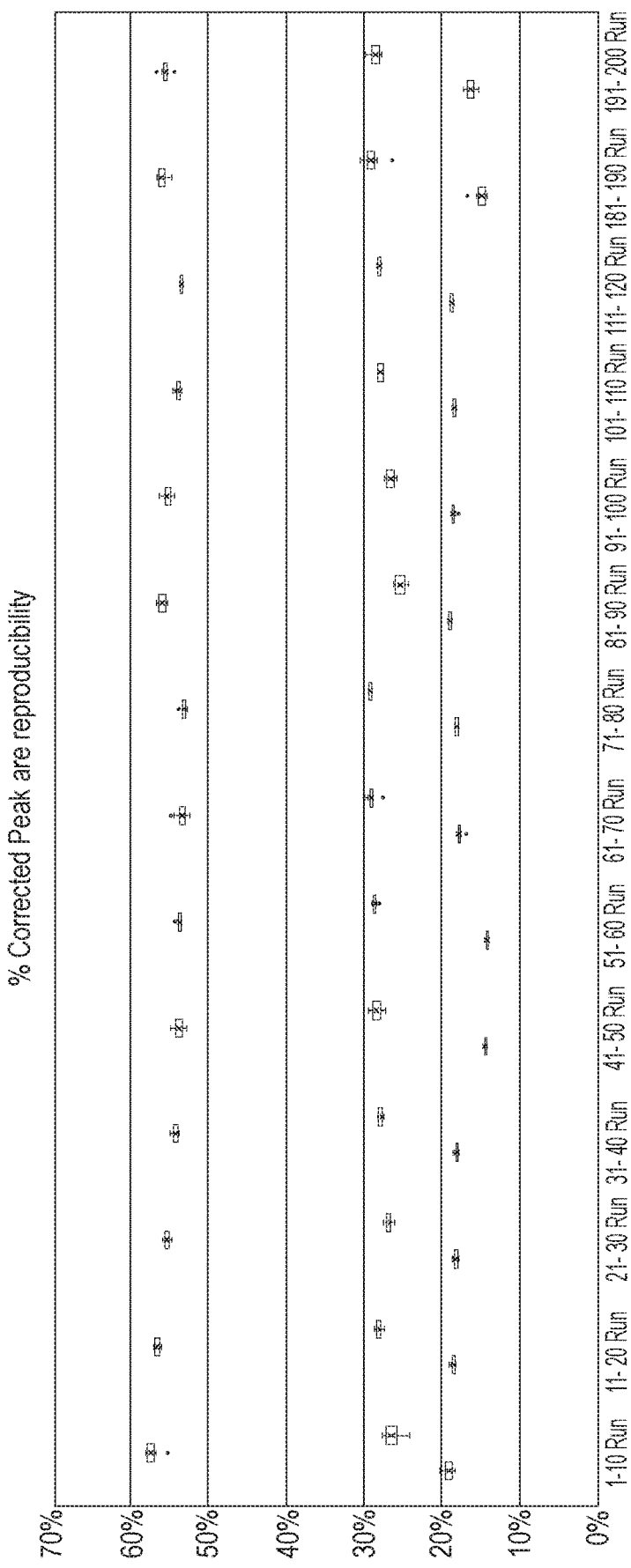
FIG. 13 illustrates the percent corrected peak area results for an IgG Reference Standard according to an embodiment of the disclosure.

FIG. 12 shows detection times of an IgG Reference Standard with pI 10.0, 9.5, and 5.5 markers in 80 cIEF runs of a neutral capillary that was heated at 55° C. for 6 days and rinsed with the acidic high polymer composition for 30 min at 50 psi. As further shown in FIG. 13, when using an IgG Reference Standard with pI 10.0, 9.5, and 5.5 markers, the protein resolution is equal to or less than 0.03 pI units, the standard deviation of measured pI value is less than 0.2 pI units over at least 100 runs, normalized peak area reputability is less than 3% RSD for the first 20 runs and the last 20 runs over a least 100 runs for the main isoform IgG region, and linearity of the cIEF assay pI determination is square(R)>0.98 for the pI range 4-10.

Figure 14A:
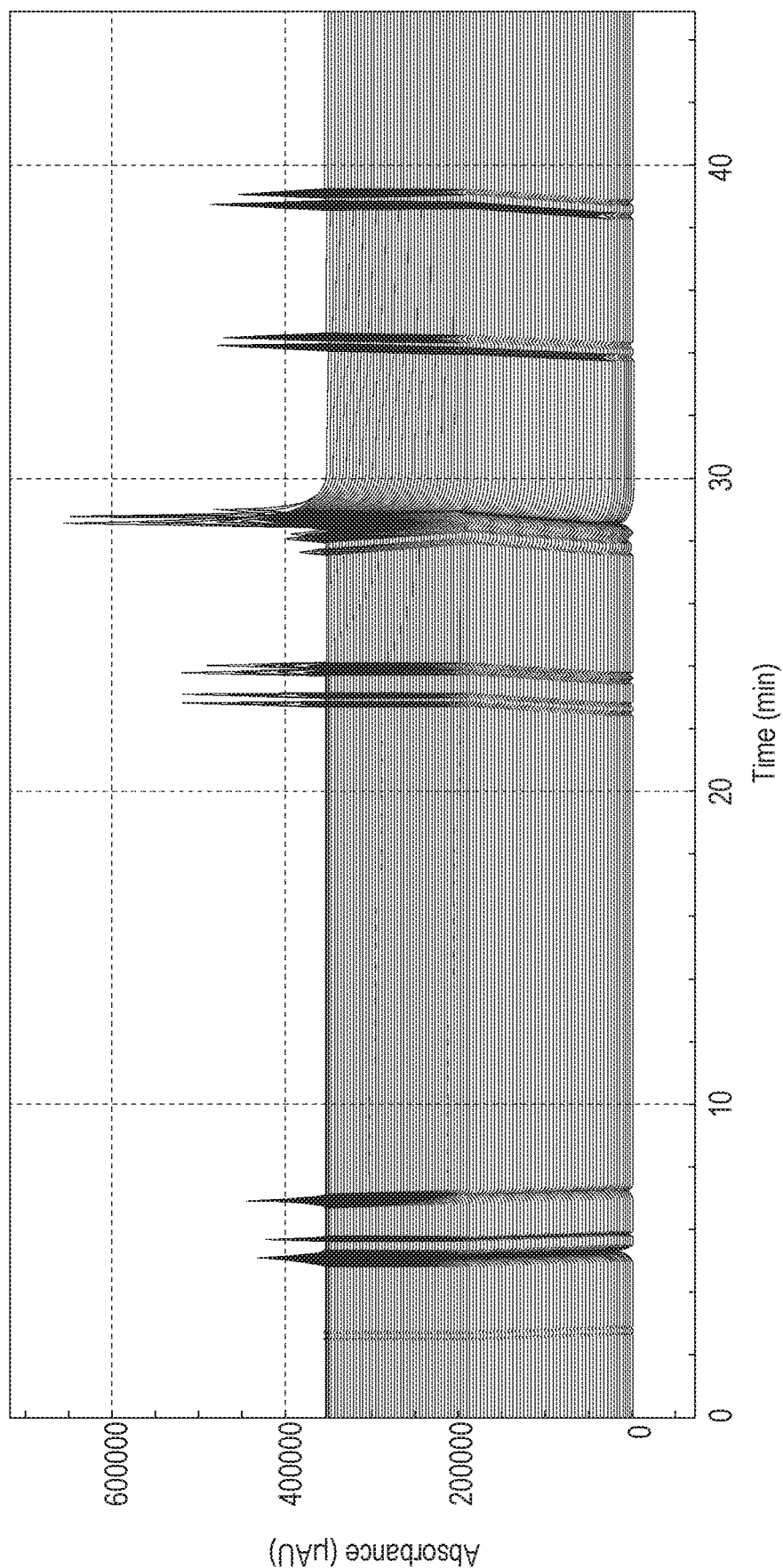
FIG. 14A illustrates the detection times of an IgG reference standard with pI 10.0, 9.5, 5.5, and 4.1 markers according to an embodiment of the disclosure.
Figure 14B:
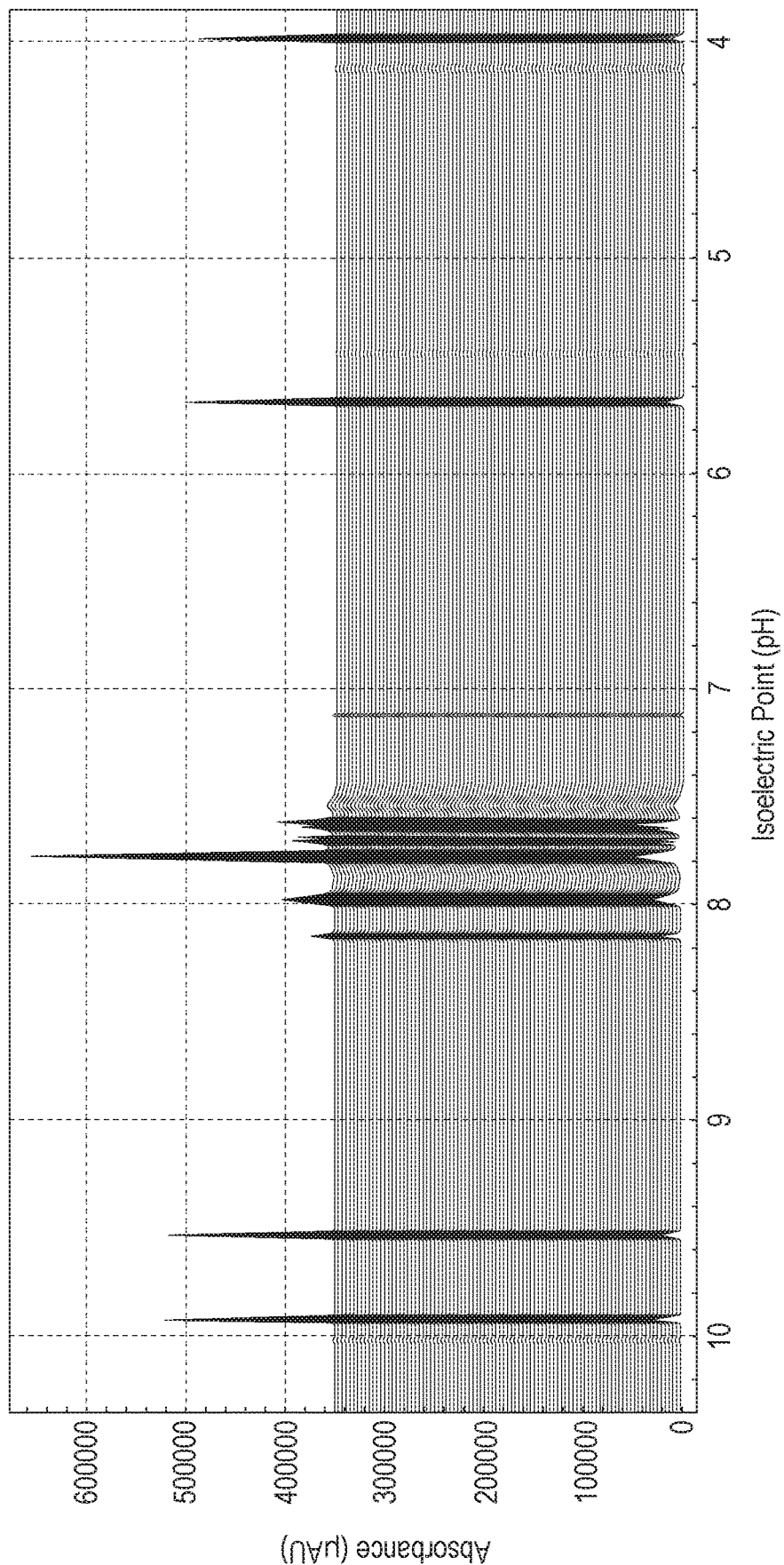
FIG. 14B illustrates the isoelectric points of the pI 10.0, 9.5, 5.5, and 4.1 markers.
Figure 14C:
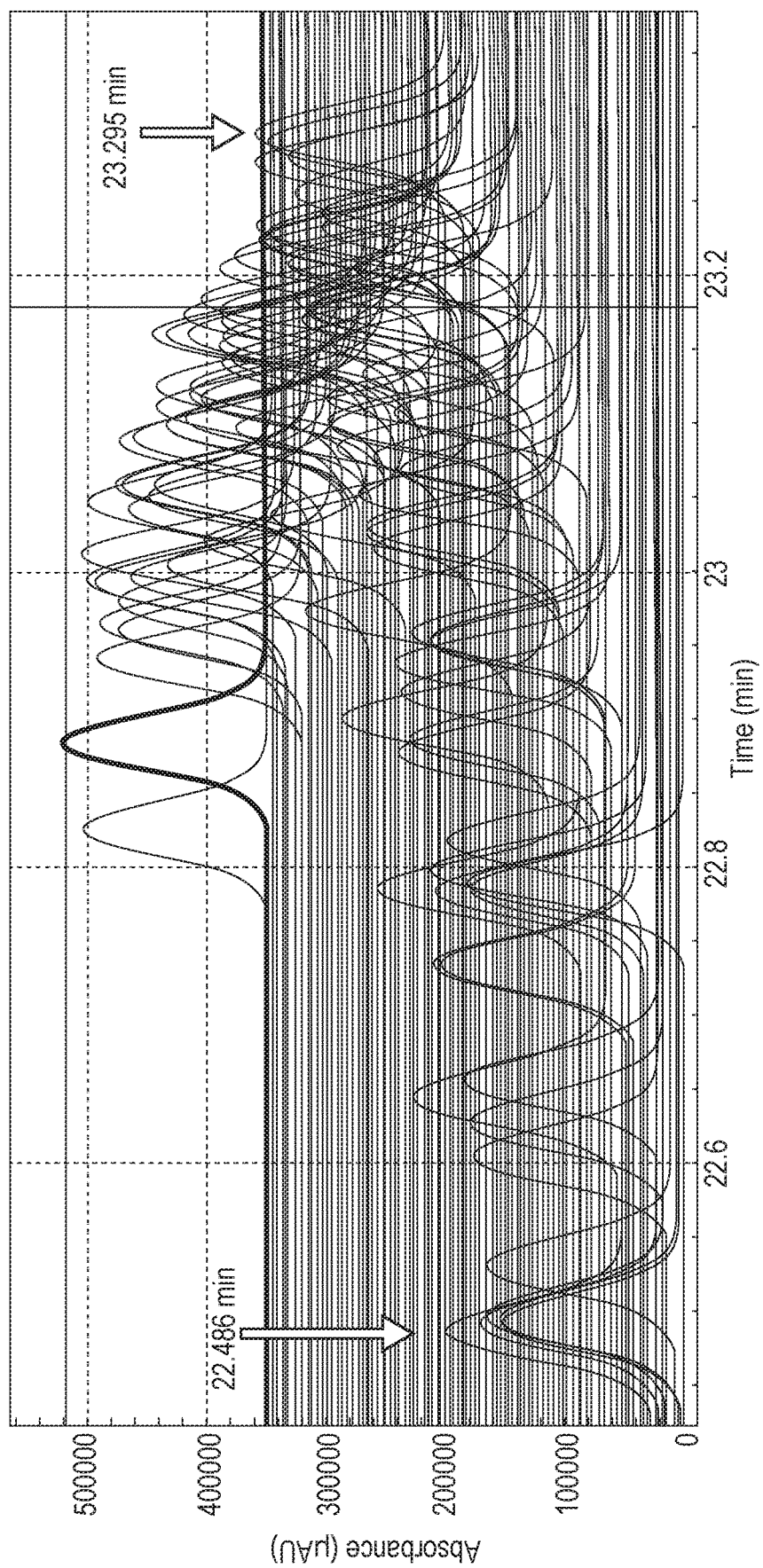
FIG. 14C illustrates differences in detection times for the pI 10.0 marker.

FIG. 14A illustrates the detection times of an IgG Reference Standard with pI 10.0, 9.5, 5.5, and 4.1 markers using 8 capillaries cartridge with 12 cIEF separations per cartridge. FIG. 14B illustrates the same data after converting the X-axis from migration time to isoelectric point. As shown in FIG. 14C, the difference in time between the highest detection time (23.295 min) and the lowest detection time (22.486 min) for the pI 10.0 marker is 0.809 min or 48.5 sec.

It will be appreciated by one of ordinary skill how similar studies can be done using the acidic high polymer composition with various cIEF standards to achieve consistent detection times and run reproducibility.

Figures 16A, 16B:
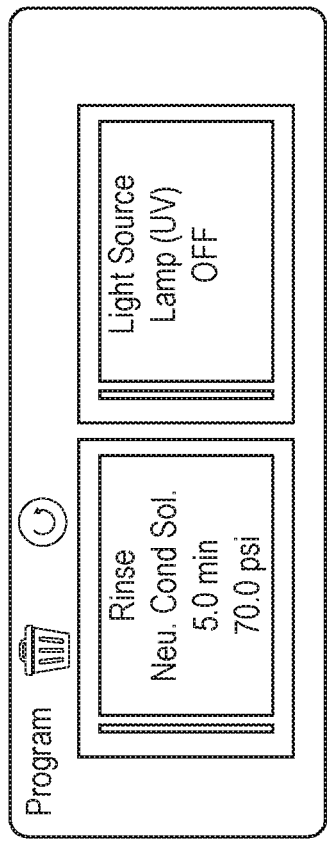
FIGS. 16A and 16B illustrate a shutdown method according to an embodiment of the disclosure.

Various shutdown methods may be conducted using the acidic high polymer composition. In an embodiment, the use of the acidic high polymer composition allows for traditional cIEF cleaning and cIEF rest to be combined in one shutdown step. In an operational example, which is intended to illustrate but not limit the scope of the disclosure, FIG. 15 shows a 36-minute shutdown method in which a neutral capillary is rinsed first with a chemical mobilizer for 3 minutes at 50 psi. Various chemical mobilizers, such as acetic acid, can be used. A second rinse is conducted with water at 50 psi for 2 minutes and a third rinse is conducted with the acidic high polymer composition at 70 psi for 10 minutes. FIGS. 16A and 16B show a 15-minute shutdown in which a neutral capillary is rinsed with the acidic high polymer composition at 70 psi for 5 minutes.

In an embodiment, the acidic high polymer composition is part of a kit, in particular a cIEF kit. The kit may comprise at least one stabilizer, an anolyte, a catholyte, and an acidic high polymer composition as described herein. In some embodiments, the kit comprises an anodic stabilizer and a cathodic stabilizer. The kit may further comprise a cIEF gel, a chemical mobilizer, CE-grade water, a carboxylic acid amide, and/or urea or carbamide. In some embodiments, the carboxylic acid amide is formamide.

While the present disclosure has been described with reference to certain embodiments, it will be understood by those skilled in the art that various changes maybe made and equivalents may be substituted without departing from the scope of the present disclosure or appended claims. In addition, many modifications may be made to adapt a particular situation or material to the teachings of the present disclosure without departing from its scope. Therefore, it is intended that the present disclosure not be limited to the particular embodiments disclosed, but that the present disclosure will include all aspects falling within the scope of the appended claims.

What is claimed is:

1. A method of improving capillary isoelectric focusing (cIEF) robustness or performance, the method comprising preparing a neutral capillary using an acidic high polymer composition comprising about 1.0% (w/v) polymer and about 4% (v/v) carboxylic acid, wherein the polymer has a molecular weight of at least about 900,000 Daltons.

2. An acidic high polymer composition comprising about 1.0% (w/v) polyethylene oxide (PEO) and about 4% (v/v) acetic acid (HAc), wherein the PEO has a molecular weight of at least about 900,000 Daltons.

3. A neutral capillary storage or conditioning solution comprising an acidic high polymer composition wherein the acidic high polymer composition comprises about 1.0% (w/v) polyethylene oxide (PEO) and about 4% (v/v) acetic acid (HAc), wherein the PEO has a molecular weight of at least about 900,000 Daltons.

4. A method of improving capillary isoelectric focusing (cIEF) robustness or performance, the method comprising preparing a neutral capillary using an acidic high polymer composition, wherein the acidic high polymer composition comprises about 1.0% (w/v) polyethylene oxide (PEO) and about 4% (v/v) acetic acid (HAc).

5. The method of claim 4, wherein the PEO has a molecular weight of at least about 900,000 Daltons.

6. The method of claim 4, wherein the improved robustness or performance is selected from the group consisting of reduced column conditioning time, faster capillary absorption, minimized cIEF performance variations between capillaries between lots and within lots, minimized detection time fluctuations between replicate separations, improved assay robustness, increased detection time reproducibility and increased coating lifespan and/or uniformity of the capillary.

7. The method of claim 4, wherein the preparation of the neutral capillary comprises a step selected from the group consisting of a storing step, a conditioning step, a rinse in separation step, a resting step, a cleaning step, coating regeneration step, and recoating step.

8. The method of claim 7, wherein the conditioning step comprises rinsing the neutral capillary with the acidic high polymer composition at 50 psi for 1-30 min.

9. The method of claim 7, wherein the rinse in separation step comprises rinsing the neutral capillary at least one time with the acidic high polymer composition, formamide, and water.

10. The method of claim 7, wherein the coating regeneration step and/or recoating step is performed after the end of twenty cIEF separations.

11. The method of claim 10, wherein the coating of the neutral capillary is regenerated within less than 24 hours.

12. The method of claim 7, wherein the cleaning step comprises rinsing the neutral capillary at least one time with the acidic high polymer composition, acetic acid, and water.

13. The method of claim 4, wherein the method is conducted at room temperature.

14. A kit comprising at least one stabilizer, an anolyte, a catholyte, and a acidic high polymer composition comprising about 1.0% (w/v) polymer and about 4% (v/v) carboxylic acid, wherein the polymer has a molecular weight of at least about 900,000 Daltons.

* * * * *